Feb. 2, 1937.    R. L. DAVIS    2,069,521
POLYPHASE OSCILLATOR
Filed June 15, 1935

WITNESSES:

INVENTOR
Robert L. Davis.
BY
ATTORNEY

Patented Feb. 2, 1937

2,069,521

UNITED STATES PATENT OFFICE 2,069,521

POLYPHASE OSCILLATOR

Robert L. Davis, Grand Rapids, Mich., assignor to Westinghouse Electric & Manufacturing Company, East Pittsburgh, Pa., a corporation of Pennsylvania Application June 15, 1935, Serial No. 26,791

4 Claims. (Cl. 250—36)

My invention relates broadly to the generation of polyphase high frequency currents and more particularly to a system for the generation of polyphase energy utilizing electronic tubes as the generating means.

One of the objects of my invention is to provide an oscillation generator capable of developing polyphase energy.

Another object of my invention is to provide suitable electron discharge device circuits capable of the production of polyphase currents.

Additional objects of my invention will be brought out in the following description of the same.

In the accompanying drawing, I have disclosed two circuits embodying electron discharge devices, each circuit being capable of carrying out the objects of my invention, namely that of generating high frequency polyphase currents. Each of the circuits, as disclosed, is designed to generate three-phase power, although it should be apparent that the circuits may be modified in accordance with the theory of polyphase transformer connections, to obtain the generation of high frequency energy at any number of phases.

Figure 1:
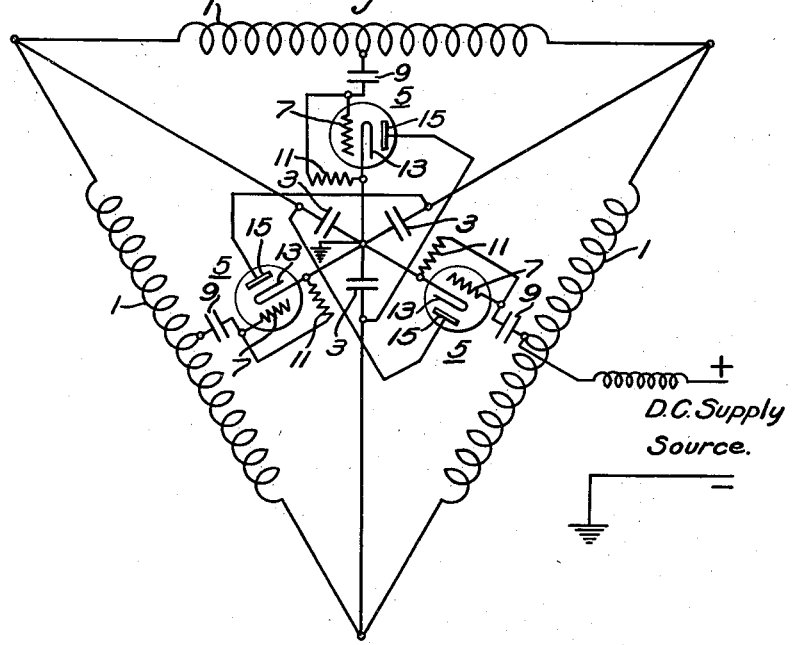

Referring to Figure 1, the circuit comprises three inductors 1 connected in delta, and interconnecting the corners thereof I provide three capacitors 3 connected in star connection, the center point of which is grounded. The electron discharge devices 5 embodied in the circuit are connected therein as follows. The grid 7 of each tube is connected through a blocking condenser 9 to the midpoint of one of the delta connected coils, a suitable grid leak 11 being provided between the grid 7 and the filament 13 which is connected or grounded to the center point of the star connected condensers 3. The anode 15 of each tube is not connected to either of the adjacent capacitors of the Y connection, but is connected to that condenser furthest from the grid connection of the tube to the coil. Plate potential for the anodes may be applied to practically any point in the delta connected coil arrangement although I have shown it as being connected to the midpoint of one of said coils. The negative end of the plate potential supply being grounded closes the plate circuit to the grounded portion of the filament.

Figure 2:
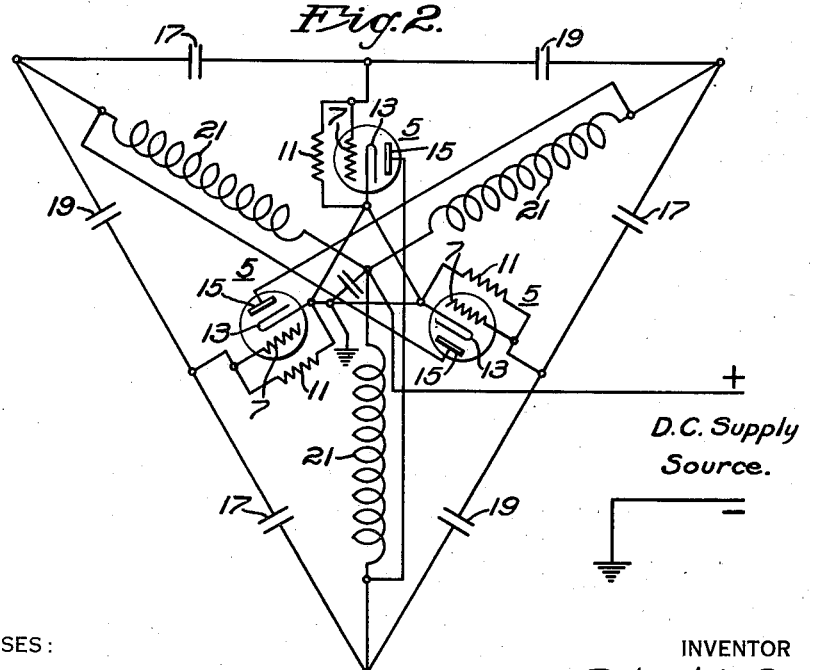

In Fig. 2, the arrangement of the elements is slightly different from that of Fig. 1 in that in this circuit I have provided a delta arrangement of capacitors each branch containing a pair of condensers 17, 19, and interconnecting the corners thereof, a Y or star connection of coils 21, the center point of which is grounded through a source of power supply for the anodes 15 of the tubes 5, which anodes are connected to the corners of the delta arrangement of capacitors. In each branch of the delta arrangement, a suitable grid leak 11 is provided between the grid and the filament or cathode. Whereas in Fig. 1 the anode 15 of each tube is connected to a condenser 3 furthest removed from the grid connection, in the arrangement of Fig. 2, the anode 15 is connected to the coil 21 furthest from the grid connection, the grids of the tubes 5 in Fig. 2 being connected intermediate the condensers of each branch. The filaments 13 are connected in delta to conform with the other changes in the circuit and are grounded as in Fig. 1, thus completing the plate circuit for the tubes.

The power supply source is shunted by a bypass condenser 23. Each of the above circuits is capable of generating three-phase energy, it being of particular interest to note that the excitation for the grid of any one of the tubes is not derived from the plate circuit of the same tube, but from the circuits of the other tubes. In other words, the generator does not comprise merely a combination of three single phase oscillators connected to produce three-phase energy, but relies upon the interaction of the circuits of one tube with those of the others to obtain the desired results.

Thus in Fig. 1, for example, the grid of one tube derives its excitation from the plate circuits of the other two tubes and the same applies to all the tubes of that circuit.

In Fig. 2, we have a similar situation wherein the grid of any one tube derives its excitation from the plate circuits of the other two tubes. Thus, the operation of the system requires that all the discharge devices be present in the circuit and the removal of any one will stop the operation thereof, indicating that the excitation to at least one of the tubes has been suppressed.

The energy output of the oscillator may be derived therefrom through inductive or capacitive coupling or by direct connection to any portion of the circuit across which potentials are developed.

While I have disclosed two embodiments of my invention, it should be apparent that various changes may be suggested to those skilled in the art and I, therefore, desire that my protection be not limited to the specific circuits and details disclosed except as may be necessitated by the prior art and the appended claims.

I claim as my invention:

1. A polyphase oscillator comprising a plurality of electron discharge devices each having a cathode, control electrode and anode, a plurality of similar impedances of one type connected in delta, a plurality of impedances of another type connected in star and arranged to interconnect the corners of said delta connection, and means for electrically connecting said control electrodes, each to a mid-point of the impedance in one of said delta branches, means for connecting said anodes, each to a corner of said delta arrangement, and means for connecting said cathodes in circuit with said anodes and control electrodes.

2. A polyphase oscillator comprising a plurality of electron discharge devices each having a cathode, control electrode and anode, a plurality of capacitive impedances connected in delta, a plurality of inductors connected in star, means for electrically interconnecting said delta and star connections of impedances, means for electrically connecting said control electrodes, each to a mid-point of the capacitive impedance in one of said delta branches, means for electrically connecting said anodes, each to a corner of said delta arrangement and means for connecting said cathodes in circuit with said anodes and control electrodes.

3. A polyphase oscillator comprising a plurality of electron discharge devices each having a cathode, control electrode and anode, a plurality of inductive impedances connected in delta, a plurality of condensers connected in star between the corners of said delta arrangement, means for electrically connecting said control electrodes, each to the mid-point of one of said inductive impedances, means for electrically connecting said anodes each to a corner of said delta arrangement, and means for connecting said cathodes in circuit with said anodes and control electrodes.

4. A polyphase oscillator comprising a plurality of electron discharge devices each having a cathode, control electrode and anode, a plurality of similar impedances of one type connected in delta, a plurality of impedances of another type connected in star and arranged to interconnect the corners of said delta connection, means for coupling said control electrodes, each to one of said impedances in the delta arrangement, means for coupling said anodes each to a corner of said delta arrangement, opposite to the connection of its associated control electrode, and means for connecting said cathodes in circuit with said anodes and control electrodes.

ROBERT L. DAVIS.